United States Patent [19]

Kodama et al.

[11] 4,253,127

[45] Feb. 24, 1981

[54] MAGNETIC HEAD

[75] Inventors: Takashi Kodama; Tuneo Yanagida, both of Hachioji, Japan

[73] Assignee: Olympus Optical Co., Ltd., Tokyo, Japan

[21] Appl. No.: 20,922

[22] Filed: Mar. 15, 1979

[30] Foreign Application Priority Data

Apr. 3, 1978 [JP] Japan ................... 53-39012

[51] Int. Cl.³ .......................... G11B 5/22; G11B 5/25; G11B 5/12
[52] U.S. Cl. .................................. 360/125; 360/110; 360/119; 360/134
[58] Field of Search .................. 360/119, 122, 125, 2, 360/117, 121, 134, 131

[56] References Cited

U.S. PATENT DOCUMENTS 2,536,030  1/1951  Camras ......................... 360/110

OTHER PUBLICATIONS

IBM Tech. Disc. Bull., J. L. Dawson et al., Edge Effect Magnetic Recording, vol. 9, No. 7, Dec. 1966, p. 776.

Primary Examiner—Alfred H. Eddleman
Attorney, Agent, or Firm—Weinstein & Sutton

[57] ABSTRACT

A magnetic head comprises a magnetic record/playback limb disposed in opposing relationship with the surface of a magnetic record medium, and a flux conducting limb coupled with the record/playback limb and adapted to be disposed in opposing relationship with a lateral end face of the medium.

6 Claims, 6 Drawing Figures

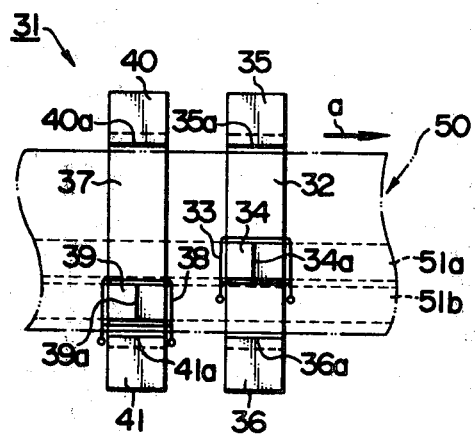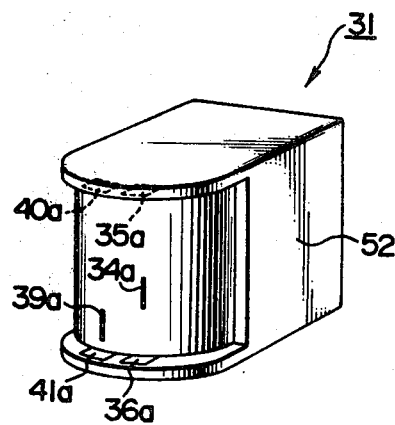

MAGNETIC HEAD

BACKGROUND OF THE INVENTION

The invention relates to a magnetic head, and more particularly, to a magnetic head for use in a tape recorder, a video tape recorder (VTR) or the like which achieves a high density recording by establishing a remanence in the direction of thickness of a magnetic record medium such as magnetic tape.

Ordinarily, the technique to record information signal on a magnetic record medium such as magnetic tape generally comprises bringing a magnetic head into contact with the surface of the medium to establish a remanence therein in a direction parallel to the surface of the medium. According to this technique, the head has its poles located opposite to each other with a narrow air gap therebetween so that a leakage flux from the gap is bypassed through the medium. Because the leakage flux passes through the medium in a direction parallel to its surface, the magnetizable material contained in the medium is magnetized in a direction parallel to the surface of the medium, with its remanence defining a magnetic recording. With the described magnetic recording technique, it is known that considerations of the air gap of the magnetic head and the frequency of the signals being recorded impose a limitation on the recording density of information signal.

Recently, a variety of recording techniques have been proposed which drastically improves the recording density by a so-called vertical magnetization scheme in which a remanence is established in the medium in a direction perpendicular to the surface thereof or in the direction of its thickness. This technique employs a magnetic record medium having an easy axis of magnetization in a direction perpendicular to the surface. Referring to FIG. 1, there is shown a magnetic record medium 6 comprising a base film 6c of polyester, for example, carrying an upper layer 6b of high permeability material and a layer 6a coated thereon which is formed of a magnetizable material having an easy axis of magnetization in a direction perpendicular to the surface.

FIG. 1 also shows a magnetic head 1 which may be used for recording a signal in such medium. Specifically, the head 1 comprises a magnetic head core 2 of a magnetizable material such as ferrite which has an inverse U-configuration, and a coil 3 disposed thereon. The core 2 includes one limb 4 which has its free end tapered, with its end face defining a narrow rectangle which is elongate in a direction perpendicular to the direction of movement of the record medium and forming a pole 4a for recording and/or playback. This end face is adapted to be disposed in abutment against the medium. The core has its other limb 5 which has an increased thickness to present an increased cross-sectional area, thus reducing its reluctance.

In operation, when a signal current is passed through the coil 3 as the medium 6 moves to the left, as viewed in FIG. 1, relative to the head 1, flux 7 is produced within the core 2 as indicated by dotted line, and passes from the pole 4a vertically through the layer 6a and passes through the layer 6b in a direction perpendicular to the surface and returns to the limb 5, thus forming a closed magnetic path. It will be seen that as the flux passes vertically through the portion of the layer 6a which is located opposite to the pole 4a, a remanence is produced therein in a direction perpendicular to the surface, and because the pole 4a has a reduced width, a high flux density is produced. In a region of the layer 6a which is located opposite to the limb 5, the flux density is greatly reduced because of an increased area of the end face of the limb 5, so that no substantial or effective magnetization occurs in this region of the layer 6a. As the medium 6 continues to move to the left relative to the head 1, a pattern of the remanence corresponding to the signal current is recorded in the top layer 6a, thus achieving a magnetic recording.

During the playback operation, the poles 4a and 5a of the magnetic head 1 are disposed close to or in abutment against the medium 6 in which the signal is recorded, and the latter moved in a direction perpendicular to the plane of the drawing. The remanence recorded in portions of the layer 6a which are located opposite to the poles 4a, 5a produces a flux to pass through the core 2 and the layer 6b, thus closing a magnetic path. The flux following the closed magnetic path links with the coil 3, producing a playback current therein in accordance with a change of the remanence in the layer 6a as medium 6 moves. The magnetic head 1 however has a tracking difficulty in that it is difficult to align the head 1 with the medium 6. As a consequence, extraneous signals other than the recorded signal which is to be reproduced may be picked up, thus causing noises.

There has also been proposed a magnetic head for vertical magnetization recording which has an inverted U-configuration as the head 1, but which has one limb having a free end of a greatly reduced width than the other limb so as to serve as a recording pole to achieve a high density recording. Referring to FIG. 2, magnetic head 11 includes a magnetic head core 12 having an inverted U-configuration, and a coil 13 disposed thereon. One limb of core 12 is used for recording or playback purpose while the other limb 15 has a reduced reluctance. The free end of the limb 14 is tapered to a sharp edge which defines a record/playback pole 14a. The pole 14a is in the form of a rectangle having a reduced width, with its lengthwise direction being disposed at right angles to the direction of movement of medium 6 (see FIG. 1).

When the coil 13 is energized with a signal current to be recorded and the medium 6 runs, a recording flux is produced within the core 12, creating a strong remanence in a portion of the layer 6a which is located opposite to the pole 14a. In this manner, a high density recording is achieved. The flux density is reduced in a region of the layer 6a which is located opposite to the end face of the limb 15 which has an increased area, whereby no substantial magnetization occurs in this region of the layer 6a. During the playback operation, the pole 14a and the end face of the limb 15 are disposed opposite to the medium 6. The remanence recorded in the medium 6 follows a closed path including the core 12, and hence as the medium 6 is moved relative to the core 12, a playback current is produced in the core 13.

The magnetic head 11 suffers from the same disadvantage as the magnetic head 1. In addition, the limb 15 may pick up extraneous signals other than the intended recorded signal. Specifically, though it has been described previously that the flux which passes through a portion of the layer 6 opposite to the end face of the limb 15 during the recording process has a reduced density, it does have a certain degree of magnetization. The area of the end face of the limb 15 is by orders of magnitude greater than that of the pole 14a. As the signal is continuously recorded in the layer 6 from the pole 14a, the latter successively faces unrecorded regions of the layer 6a, but only a very limited area of the end face of the limb 15 faces an unrecorded region of the layer 6a while the remainder of the end face of the limb 15 faces an already recorded region of the layer 6a. Consequently, a magnetization of the region of the layer 6a which is located opposite to the limb 15 occurs repeatedly, though of a reduced magnitude. Thus, there exists a remanence of a reduced magnitude as a result of a repeated recording in the region of the layer 6a located opposite to the limb 15, and during the playback, it may be picked up simultaneously with the desired recorded signal, causing noises.

SUMMARY OF THE INVENTION

It is an object of the invention to avoid the described disadvantages by providing a magnetic head for vertical magnetization recording which includes a magnetic record/playback limb disposed in opposition to the surface of a magnetic record medium and a flux conducting limb disposed in opposition to a lateral edge face of the medium.

In accordance with the invention, the pole of record/playback limb alone is disposed in opposition to a layer of magnetizable material contained in the medium, and the closed magnetic path which is formed during the recording and playback process passes through the layer of magnetizable material only once, so that extraneous signals other than the recorded signal cannot be picked up to cause noises.

The flux conducting limb which is disposed in opposition to a lateral edge face of the medium greatly facilitates a positioning of the magnetic head relative to the medium. In addition, the flux conducting limb serves as a guide for a tape running, eliminating a tracking error.

BRIEF DESCRIPTION OF THE DRAWINGS

FIG. 5 is a fragmentary front view of the head shown in FIG. 4; and

FIG. 6 is a perspective view of the magnetic head shown in FIGS. 4 and 5 contained in a shielded casing.

DESCRIPTION OF PREFERRED EMBODIMENTS

Figure 1:
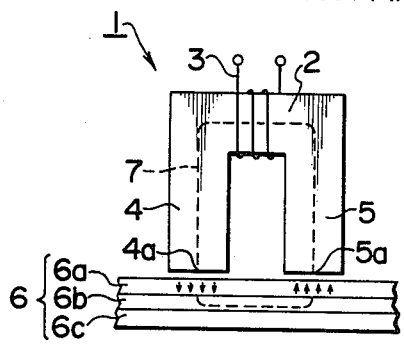
FIGS. 1 and 2 are a plan view and a perspective view of conventional magnetic heads for vertical magnetization recording.
Figure 2:
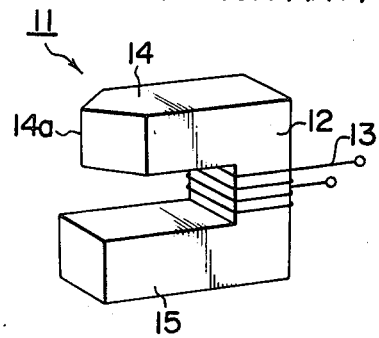
Figure 3:
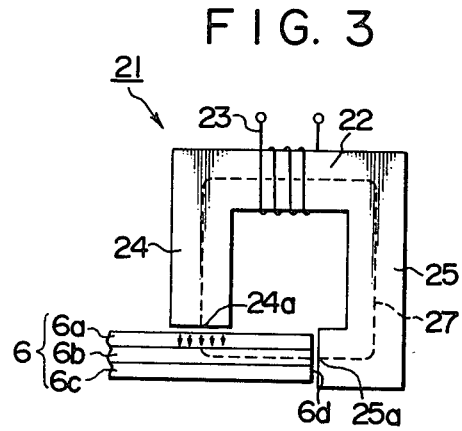
FIG. 3 is a plan view of a magnetic head according to one embodiment of the invention.

Referring to FIG. 3, there is shown a magnetic head for vertical magnetization recording which is constructed in accordance with one embodiment of the invention. The magnetic head 21 comprises a magnetic head core 22 formed of magnetizable material such as ferrite, for example, and a coil 23 disposed thereon.

The core 22 comprises a horizontally extending arm, a magnetic record/playback limb 24 which depends downwardly from the left-hand end of the arm, and a flux conducting limb 25 of an inverted L-configuration which depends downwardly from the right-hand end of the horizontal arm. The limb 24 has its free end disposed in opposing relationship with the surface of the medium 6 and defining a pole 24a, which is used to record information signal in the medium or to reproduce information therefrom. The free end of the limb 25 is disposed in opposing relationship with one lateral end face 6d of the medium 6, defining a pole 25a for conducting a flux which passes through the high permeability layer 6b of the medium.

When the head 21 is disposed relative to the medium 6 such that the layer 6a is disposed close to or in abutment against the pole 24a, and the medium 6 runs in a direction perpendicular to the plane of the drawing, as viewed in FIG. 3 while passing a signal current through the coil 23, a recording flux 27 is then produced within the core 22, and follows a closed magnetic path including the high permeability layer 6b. When vertically passing through a portion of the layer 6a which is located opposite to the pole 24a, it magnetizes the magnetizable material of this portion in the direction of its thickness, thus achieving a magnetic recording of the signal. After passing through the layer 6b, the flux is then diverted through the lateral end face 6d of the medium 6 to the pole 25a, thus returning to the core 22. In this manner, the flux has no substantial influence except recording the signal in the medium 6.

In the playback operation, the medium 6 is disposed in the same manner as it is disposed during the record mode, and is driven to run in the same direction as before. Then, the remanence recorded in the portion of the layer 6a located opposite to the pole 24a passes through a closed magnetic path including the core 22 and the layer 6b. As the flux links with the coil 23, a signal current is reproduced in the coil 23 in accordance with a varying remanence recorded in successive regions of the medium 6.

It is to be noted that in the embodiment described above, the closed magnetic path which is formed during the record and/or playback mode traverses the layer 6a only once, recording the signal in a given region of the layer 6a while avoiding any influence upon the remaining portion thereof, and reproducing the signal from the given portion of the layer during the playback operation while preventing a pickup of any extraneous signal from the remainder. Because the single limb 24 is disposed in opposing relationship with the surface of the medium 6, recording tracks can be effectively utilized in a multi-channel recording operation, allowing a high density recording.

Figure 4:
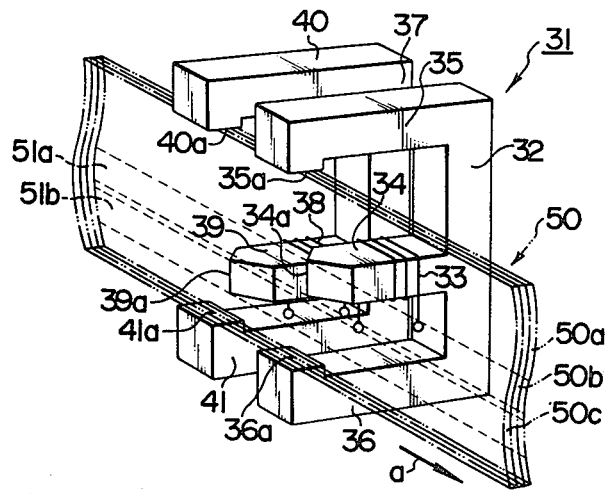
FIG. 4 is a perspective view of another embodiment of the invention.

FIGS. 4 and 5 show another embodiment of the invention. This magnetic head 31 is adapted to cooperate with two tracks formed on one side of a magnetic tape. FIG. 6 shows the head 31 as contained in a shielded casing 52.

The head 31 comprises a pair of magnetic head cores 32, 37, and a pair of coils 33, 38 disposed on the respective cores. The cores 32, 37 comprise upper and lower limbs 35, 36 and 40, 41 which extend horizontally from the top and bottom ends of their vertical limbs, and magnetic record/playback limbs 34, 39 which extend horizontally from a central position on the vertical limbs. At their free end, limbs 35, 40 have a downward extension of a short length which defines upper, flux conducting poles 35a, 40a. Similarly, the free end of the lower limbs 36, 41 have an upward extension of a short length, which defines lower, flux conducting poles 36a, 41a. These poles 35a, 36a, 40a, 41a are vertically aligned, and are disposed close to or in abutment against the opposite lateral end faces of a magnetic tape 50 in order to form a satisfactory closed magnetic path and to serve as a guide as the tape 50 runs.

It will be noted that the limbs 34, 39 are located at different vertical elevations such that the pole 34a on the limb 34 cooperates with an upper track 51a while the pole 39a on the limb 39 cooperates with a lower track 51b formed in the lower half of the tape 50. The poles 34a, 39a are formed as end faces which are in the form of elongate rectangles, with their length extending perpendicular to the direction of movement of the tape 50. It is to be understood that the cores 32, 37 are magnetically shielded from each other by means of a magnetic shielding plate, not shown, when they are received within the casing 52.

The magnetic tape 50 is formed in the same manner as the medium 6 mentioned above. Specifically, it comprises a base film 50c carrying thereon a layer 50b of a magnetizable material of a high permeability, and a top layer 50a coated on the layer 50b and having an easy axis of magnetization in the direction of the thickness thereof. The tape 50 is disposed so that its layer 50a is located nearer or in abutment against the poles 34a, 39a, with its opposite lateral end faces located close to or abutting against the poles 35a, 36a and 40a, 41a, respectively. When it is driven to run in a direction indicated by an arrow a, while simultaneously passing a signal current through the coils 33, 38, recording fluxes are produced within the cores 32, 37. The flux produced in the core 32 follows a closed magnetic path including the high permeability layer 50b, limbs 34, 39, layer 50a, layer 50b, limbs 35 and 40 while the flux produced in the core 37 follows a closed magnetic path including limbs 34, 39, layer 50a, layer 50b, and limbs 36, 41. When passing through portions of the layer 50a which are located opposite to the poles 34a, 39a, the flux magnetizes these portions in the direction of the thickness of the layer, thus achieving a magnetic recording.

When the signal recorded in the tape 50 is to be reproduced, the tape 50 is disposed in the same manner as it is disposed during the record mode. As the tape is driven to run in a direction of arrow a, the remanence recorded in the portion of the layer 50a located opposite to the poles 34a, 39a produce fluxes which follow the two closed magnetic paths mentioned above. As they pass through the respective magnetic paths, they link with the coils 33, 38, producing signal currents therein in accordance with the varying remanence recorded in the layer 50a.

This embodiment achieves the similar effects as those achieved by the embodiment shown in FIG. 3. In addition, the pair of flux conducting limbs 35, 36 and 40, 41 disposed in opposing relationship with the both lateral end faces of the tape 50 assures a satisfactory formation of closed magnetic paths. In addition, the tracking capability is improved inasmuch as the poles 35a, 36a and 40a, 41a serve as guides for the tape 50 as it runs.

In the above description, two tracks are formed on one side of the tape and are simultaneously used for recording or reproduction purpose. However, it will be understood that one of the heads may be used as a record track while the other as a playback tape so that a record and a playback operation occur simultaneously as the tape runs in either direction. Also, it should be understood that more than two tracks may be formed on one side of the tape, and a corresponding multi-element head can be constructed in accordance with the invention to cooperate with such tape. Finally, in the described embodiments, the flux conducting limb or limbs are shaped into an L-configuration so as to provide an extension of a short length, but such extension may be omitted.

What is claimed is:

1. A magnetic head for use with a magnetic record medium including a layer of magnetizable material of a high permeability, a layer of magnetizable material disposed on one side of the high permeability layer and having an easy axis of magnetization in the direction of its thickness, and a film base disposed on the other side of the high permeability layer; the head comprising a magnetic record/playback limb disposed in opposing relationship with said one side of the medium, a magnetic head core coupled with the limb and including a flux conducting limb separate from said record/playback limb which is adapted to be disposed in opposing relationship with a lateral end face of the medium, and a coil disposed on the core.

2. A magnetic head according to claim 1, including a pair of flux conducting limbs disposed on the opposite sides of the record/playback limb and disposed in opposing relationship with the both lateral end faces of the medium.

3. A magnetic head according to claim 2 in which the flux conducting limbs serve as guides for the medium as it runs.

4. A magnetic head for use with a magnetic record medium, said magnetic medium including top and bottom surfaces and side edges, said magnetic head comprising a magnetic head core having a coil disposed thereon, a magnetic record/playback element including an end face to be disposed adjacent the top surface of said medium, and a flux conducting element separate from said record/playback element to be disposed adjacent to one of the side edges of said medium so that the magnetic flux path produced passes only once through the top surface of said medium in a direction perpendicular thereto and only once through the side edge of said medium in a direction perpendicular thereto.

5. A magnetic head in accordance with claim 4, wherein said medium includes an upper layer and a lower layer, and said magnetic flux path extends from the end face of said magnetic record/playback element through said upper layer to said lower layer and from said lower layer to the side edge of said medium to said flux conducting element.

6. A magnetic head for use with a magnetic record medium adapted to move in a longitudinal direction, said magnetic medium including top and bottom surfaces and side edges, said magnetic head comprising a magnetic head core having a coil disposed thereon, a magnetic record/playback element including a first end face to be disposed adjacent the top surface of said medium, and a flux-conducting element separate from said record/playback element including a second end face to be disposed adjacent to one of the side edges of said medium so that the magnetic flux path produced passes between said first and second end faces and through said magnetic record medium in a direction transverse to said longitudinal direction.

* * * * *

UNITED STATES PATENT AND TRADEMARK OFFICE
CERTIFICATE OF CORRECTION

PATENT NO. : 4,253,127
DATED : February 24, 1981
INVENTOR(S) : Takashi Kodama; Tuneo Yanagida It is certified that error appears in the above—identified patent and that said Letters Patent is hereby corrected as shown below:

Column 1, line 40, before "layer" insert --top--.

Signed and Sealed this

Fifth Day of May 1981

[SEAL]

Attest:

RENE D. TEGTMEYER

Attesting Officer     Acting Commissioner of Patents and Trademarks